Jan. 30, 1962   G. A. LYON   3,019,055
WHEEL COVER
Filed Nov. 9, 1959   2 Sheets-Sheet 2
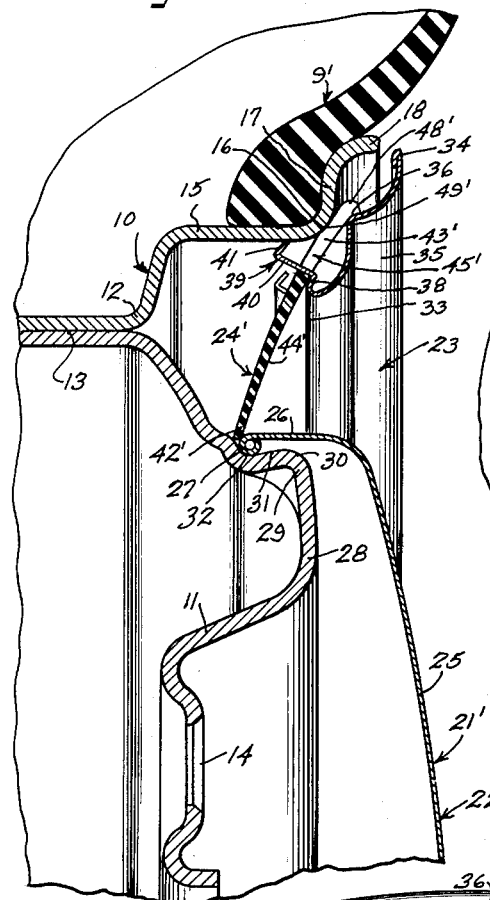
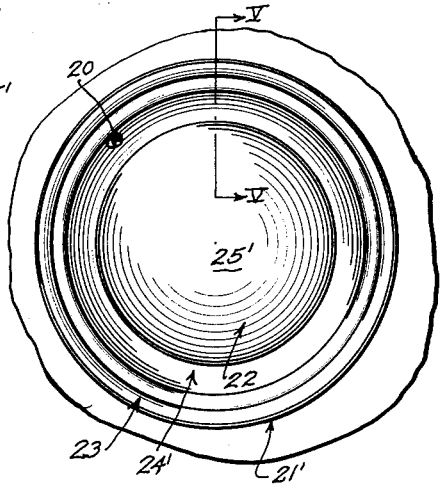
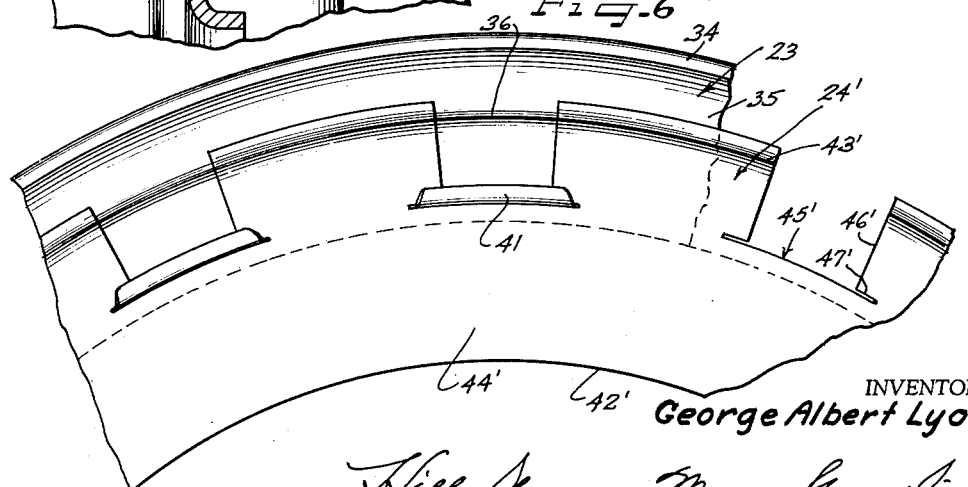
INVENTOR
*George Albert Lyon*
BY
ATTORNEYS

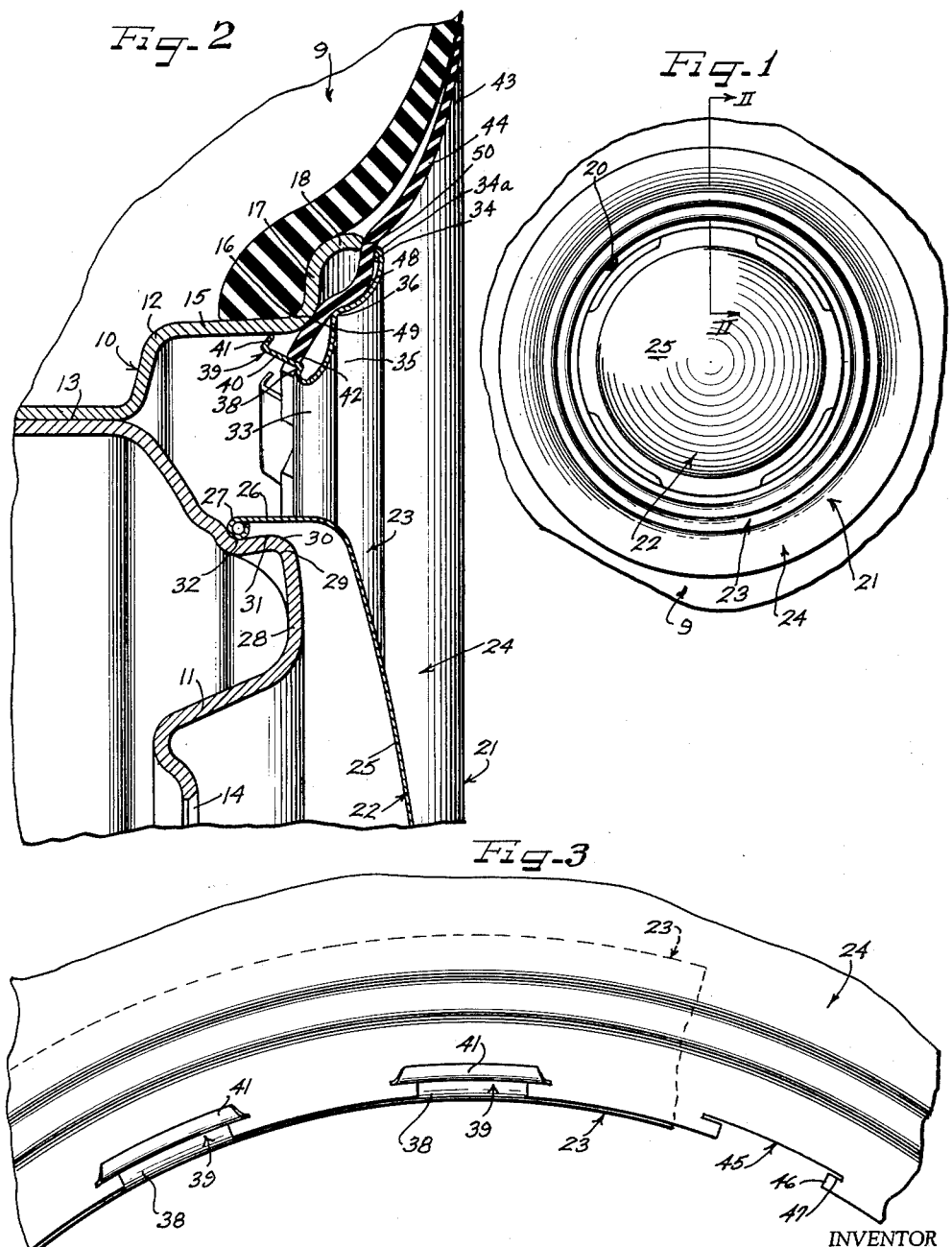

United States Patent Office 3,019,055
Patented Jan. 30, 1962

3,019,055
WHEEL COVER
George Albert Lyon, Detroit, Mich., assignor to Lyon Incorporated, Detroit, Mich., a corporation of Delaware
Filed Nov. 9, 1959, Ser. No. 851,576
17 Claims. (Cl. 301—37)

The present invention relates generally to wheel structures and more particularly to a cover structure for retained disposition upon the outerside of a vehicle wheel and which cover structure is not only adapted to protect the wheel but in addition is adapted to ornament the wheel.

In the motor car industry there has been a considerable demand for an attractive new type of cover structure which is capable of substantially concealing the wheel including the rim and body parts. The cover structure, according to the principles of the present invention, utilizes a metallic cover or rim member and a synthetic ring member whereby the metallic cover member has means to fasten itself as well as the synthetic ring to the wheel. In one form of the invention, the synthetic ring is adapted to bridge over the terminal rim flange to conceal it and it also covers a portion of the tire side wall. In the other form of the invention, the synthetic ring is bridged across the gap between the tire rim and the body part. In both forms of the invention, the synthetic ring provides a very attractive contrast with respect to the metallic cover member that are used in combination with it. This is especially true since the synthetic ring may be colored in a wide range of colors and it may be colored to match the finish of the vehicle, if desired.

An important object of the present invention is to provide a cover structure including a cover member and a synthetic ring which cover member has new and improved means for retaining itself upon a wheel while at the same time retaining the synthetic ring on the wheel.

Still another important object of the present invention is to provide a cover structure including a cover member and a synthetic ring which cover structure has new and improved means for retaining itself in assembly with the synthetic ring prior to the assembly of the cover member and the synthetic ring with the wheel.

A still further object of the present invention is to provide a new and improved cover structure which may be economically manufactured on a large production basis at a minimum of expense.

According to the general features of the present invention there is provided a metallic ring member having an inner margin provided with resiliently deflectable extensions which are turned generally axially away from the inner ring margin for engagement with the intermediate rim flange of a vehicle wheel.

According to other features of the present invention, the resiliently deflectable extensions are provided on the aforesaid metallic ring are adapted to be engaged in slot areas provided on a synthetic ring in which extensions extend through the ring for engagement with the intermediate rim flange to secure the synthetic ring and the retaining extensions in locked assembly together and in assembly on the tire rim.

According to further features of the present invention, each of the slot areas is generally T-shaped in cross-section and the stem of the T of the slot extends generally in a radial direction whereas the cross-piece of the T extends in a circumferential direction.

Other objects and features of the present invention will more fully become apparent in view of the following detailed description taken in conjunction with the accompanying drawings illustrating therein several embodiments and in which:

FIGURE 1 is a front elevation of a wheel structure, according to the features of the present invention;

FIGURE 2 is an enlarged fragmentary cross-sectional view taken substantially on the line II—II looking in the direction indicated by the arrows, as shown in FIGURE 1;

FIGURE 3 is an enlarged fragmentary rear elevation of a metallic ring and a synthetic ring shown in full and dotted lines highlighting the relationship of the cover members when engaged in assembly together;

FIGURE 4 is a front elevation of a modified wheel structure, according to other features of the present invention;

FIGURE 5 is an enlarged fragmentary cross-sectional view taken substantially on the line V—V looking in the direction indicated by the arrows, as shown in FIGURE 4; and FIGURE 6 is an enlarged fragmentary rear elevation similar to FIGURE 3 only illustrating the modified synthetic ring and its manner of coaction with the metallic cover member.

As shown on the drawings:

The reference numeral 9 indicates generally a wheel structure including a wheel 10. The wheel 10 is comprised of a body part 11 and a multi-flanged drop center type of tire rim 12 which is welded in assembly to the body part 11, as indicated at 13. The body part is provided with a bolt-on flange 14 so as to enable the wheel 10 to be secured to the axle of a vehicle by means of suitable fasteners in a conventional manner. The tire rim 12 includes a generally axially extending intermediate rim flange 15, a rim shoulder 16, a radially outwardly extending rim flange 17, and a terminal rim flange 18. The rim shoulder 16 is disposed at the junction of the rim flanges 15 and 16.

Mounted upon the wheel and more particularly on the tire rim is a tire 19 which may be either of the tube or tubeless type. The tire is adapted to be inflated by inserting air through a valve stem indicated at 20 in FIGURE 1.

According to the features of the present invention, a cover structure 21 is mounted on the wheel 10 to ornament the wheel and to protect it. The cover structure 21 includes a radially inner or a central metallic cover member 22, an axially outer metallic cover or ring member 23, and an axially inner radially outwardly extending synthetic ring 24.

The inner metallic cover member 22 includes a central crown area 25 and a generally axially inwardly extending outer margin 26 which terminates in a bead 27.

The body part has a bulged area or nose portion 28 on which is provided circumferentially spaced cover retaining bumps 29. Each of the bumps 29 has a lead-in surface 30 and a generally radially and axially inwardly inclined surface 31 which leads into a cover retaining seat 32.

The inner metallic cover member 22 may be assembled on the body part by engaging the bead 27 with the lead-in body part surface 30 and urging the cover member axially inwardly until the bead 27 is flexed over the bumps 29 and is guided axially inwardly along the surfaces 31 into retained engagement in the seat 32.

The metallic ring or cover member 23 includes a radially inner margin 33 and a radially outer margin 34 which margins are connected together by an intermediate linking section 35. The intermediate section 35 is provided with a shoulder or rib area 36 which is disposed approximately midway between the radially inner and the radially outer ring margin 33 and 34.

The underturned radially inner ring or cover margin 33 includes a generally radially extending cover portion 38 and a series of circumferentially spaced resiliently deflectable retaining extensions are integral with the underturned cover or ring portion 38 so that the inner ring margin 33 conceals the extensions 39. Each of the extensions includes a generally axially inwardly radially outwardly extending leg 40 as well as a return bent short stiff generally radially and axially outwardly extending terminal 41 for edgewise engagement with the axially extending intermediate rim flange 15. It will be appreciated that the generally axially extending leg 40 converges towards the intermediate rim flange 15 and the terminal 41 is disposed between the leg 40 and the rim flange 15. The extensions 39 are normally arranged in a circle having an outside diameter which is slightly in excess of the inside diameter of the intermediate rim flange 15 so that when the ring or cover member 23 is in assembly with the wheel the resiliently deflectable extensions 39 are deflected out of normal position into tensioned cover retaining engagement with the intermediate rim flange 15.

The synthetic ring or cover member 24 includes a radially inner synthetic ring or cover margin 42 as well as a synthetic radially outer ring or cover margin 43 which margins are connected together by an intermediate ring section 44 which is bridged over the terminal rim flange 18.

The synthetic radially inner ring or cover margin 42 is provided with circumferentially spaced T-shaped slot areas 45 each of which includes a generally axially extending stem slot portion 46 and a circumferentially extending cross-piece slot portion 47. The extensions 39 are adapted to be telescoped within the slot areas 45 in order to secure the cover members 23 and 24 in assembly together. These extensions 39 may then be aligned with the wheel and more particularly with the intermediate rim flange and when the cover members 23 and 24 are urged against the wheel the extensions 39 operate to sustain the cover members 23 and 24 in assembly together on the wheel.

The inner ring margin 42 is possessed of a bulged ring area 48 which is engaged at its radially inner side by the rib or shoulder area 36 of the cover member 23 and at its radially outer side by a radially outer beaded edge 34a of the cover margin 34. When the cover members 23 and 24 are engaged in assembly on the wheel the extensions 39 cooperate with the rib or shoulder area 36 and with the beaded edge 34a to maintain the inner ring margin 42 in bottomed engagement against the tire rim at two radially spaced points. The synthetic ring member 23 has a pair of radially spaced rim engaging shoulders 49 and 50 which are maintained in bottomed engagement against the tire rim at the two points previously described as a consequence of the coaction of the extensions 39 with the rib area 36 and the beaded edge 34a. Thus when the cover members 23 and 24 are engaged in assembly on the wheel the rim engaging shoulder 49 is bottomed against the annular rim shoulder 16 and the rim engaging shoulder 50 is bottomed against the terminal rim flange 18.

When the cover members 23 and 24 are engaged in assembly on the wheel the cross-piece portion of each of the flat areas 45 cooperates with the bulged ring portion 48 to preclude radial pull-out of the ring member 24 with respect to the ring member 23 thereby precluding the centrifugal force developed during the rotation of the wheel from separating the cover members 23 and 24.

In the second form of my invention shown in FIGURES 4–6, inclusive, the same reference numerals have been used wherever possible to identify the wheel structure 9'. The wheel 10 is constructed identical to the wheel 10 previously described. Mounted on the wheel 10 is a cover structure 21'. The cover structure 21' includes a central metallic cover member 22 as well as a radially outer ring or cover member 23 which cover members 22 and 23 are identical to the ones previously described and the same references numeral have been again used. The cover structure 21' also includes a synthetic axially inner ring or cover member 24' which is of a different construction than the synthetic ring member 24.

The synthetic ring or cover member 24' includes a radially inner ring or cover margin 42' as well as a radially outer ring or cover margin 43' which margins are connected together by an intermediate linking ring section 44'. In this instance, according to features of the present invention, the radially outer margin 43' is provided with circumferentially spaced slot areas 45' each of which includes a generally extending stem slot area 46' and a circumferentially extending cross-piece slot portion 47'.

The resiliently deflectable retaining extensions 39 on the ring 23 are adapted to be engaged in the slots 45' in the same manner as previously described in connection with the first form of my invention. It will be appreciated when the extensions 39 are engaged in the slot areas 45' the ring member 23 and the ring member 24' are engaged in inner locked assembly so that they may be assembled on the wheel as a unit.

The ring member 23 and the synthetic ring 24' when assembled as a unit may be applied to the wheel by aligning the extensions 39 with respect to the intermediate rim flange 15 and causing the unit to be pressed axially against the wheel in such a way that the extensions 39 are engaged in resilient tensioned assembly with rim flange 15. The action of the retaining extensions 39 is such that the leg 40 exerts a generally radially inwardly extending force against the cross-piece slot portion or edge area 47' which force is transmitted the radial extent of the synthetic ring 24' and the inner ring margin 42' is bottomed against the body part 11. In order to sustain the radially inner ring margin 42' in bottom engagement against the body part, the central cover member 22 is assembled with the body part in the same manner as previously described. When the central cover member 22 is engaged on the body part in assembly therewith the bead 27 of the cover member bears against the radially inner ring margin 42' to sustain the same bottomed against the body part 11.

The synthetic ring or cover member 24' is provided with a bulged ring portion 48' which is adapted to be engaged by the rib area 36 to assist in maintaining rim engaging shoulder 49' in bottomed engagement against the annular rim shoulder 16. The synthetic ring member 24' is constructed in a similar manner as the synthetic ring member 25 in that it is provided with the bulged portion 48' and the rim engaging shoulder 49.

The cover structures 21 and 21' may be removed from assembly from the wheel in a suitable manner. In both forms of the invention, the cover member 22 may be removed from the wheel by inserting a pry-off tool underneath the bead 32 to disengage the bead from the bumps 30. The ring members 23 and 24 may be removed from the wheel by grasping the outer cover or ring margin 43 and pulling it away from the side wall of the tire so that a pry-off tool may be inserted between the terminal rim flange 18 and the inner ring margin 42 so that a pry-off force may be exerted against the tool to cause the retaining extensions 39 to become disengaged from the intermediate rim flange 15. The cover member 23 and the cover member 24' may be removed by inserting a pry-off tool underneath the outer ring margin 34 and by exerting a pry-off force against the outer ring margin 34 to cause the extensions 39 to become disengaged from the intermediate rim flange 15.

The present application is a continuation-in-part of my earlier filed co-pending application Serial No. 534,535, filed September 15, 1955, now Patent No. 2,926,957.

It will be understood that modifications and variations may be effected without departing from the scope of the novel concepts of the present invention.

I claim as my invention:

1. In a cover structure for self-retained assembly on a wheel, the cover structure including a metallic cover member for concealing at least a portion of the wheel and having circumferentially spaced resiliently deflectable retaining extensions annularly arranged and adapted for cover retaining press-on, pry-off engagement with the vehicle wheel, and an axially inner cover member made from a suitable synthetic material for concealing at least another portion of the wheel, the axially inner cover member having locking means for locking attachment with the extensions preventing the axially inner cover member from pulling radially away from the extensions out of assembly therewith, said locking means comprising annularly arranged circumferentially spaced slot areas with the metallic cover member having its circumferentially spaced resiliently deflectable extensions engaged in and extended through said slot areas to secure the cover members in assembly together, the extensions providing means for engaging the cover members in assembly together and in assembly with the wheel.

2. The cover structure of claim 1 further characterized by each of said slot areas being generally T-shaped in configuration.

3. The cover structure of claim 1 further characterized by said axially inner cover member comprising a ring and with the slot areas being disposed in an outer margin of the ring.

4. The cover structure of claim 1 further characterized by the axially inner cover member comprising a tire side wall simulating ring member for disposition over the tire rim as well as a side wall portion of a tire, the slot areas being disposed in an inner margin of said ring.

5. The cover structure of claim 3 further characterized by the metallic cover member comprising a metallic ring with the retaining extensions being provided at a radially inner margin of the metallic ring.

6. In a cover structure for self-retained assembly on a wheel, the cover structure including an axially outer metallic cover member for concealing at least a portion of the wheel and having circumferentially spaced resiliently deflectable retaining extensions annularly arranged and adapted for cover retaining press-on, pry-off engagement with the vehicle wheel, and an axially inner cover member made from a suitable synthetic material for concealing at least another portion of the wheel, the axially inner cover member having annularly arranged circumferentially spaced slot areas with the axially outer metallic cover member having its circumferentially spaced resiliently deflectable extensions engaged in and extended through said slot areas to secure the cover members in assembly together, the extensions providing means for engaging the cover members in assembly together and in assembly with the wheel, the axially outer cover member having an axially outer cover area disposed radially outwardly of said retaining extensions bottomed against the axially inner cover area and which axially outer cover area is cooperable with the retaining extensions to hold the axially inner cover member bottomed against the wheel.

7. In a wheel structure including a wheel having a multi-flanged tire rim, concentric radially outer ring and radially inner cover members nested one within the other, said ring member having an annular rim engaging shoulder on which the cover member is seated and retainingly held and resilient means on the cover member detachably and retainingly engageable with a flange of said rim and resiliently deflectable upon such engagement to draw said members together and to hold said shoulder tightly against said rim, the radially outer ring member being comprised of a synthetic material and having one of its radially inner and radially outer cover margins provided with circumferentially spaced slot areas, and the resilient means comprising circumferentially spaced resiliently deflectable cover retaining extensions which are telescoped through said slot areas to secure the synthetic ring and the cover member in assembly together and with the extensions engaged with a flange of the rim to hold the ring member and the cover member in assembly together on the wheel.

8. In a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially facing rim flange to sustain the cover in removable assembly on the wheel, and a radially outer ring member overlying the tire rim radially outwardly of the outer marginal cover area and with the ring member having a inner underlapping marginal ring area underlapping the outer marginal cover area and with the outer marginal cover area through the action of the retaining cover structure clamping the inner underlapping marginal ring area against the annular rim shoulder and thereby sustaining the ring member in assembly on the wheel, the radially outer ring member being comprised of a synthetic material and having one of its radially inner and radially outer cover margins provided with circumferentially spaced slot areas, and the retaining cover structure comprising circumferentially spaced resiliently deflectable cover retaining extensions which are telescoped through said slot areas to secure the synthetic ring member and the cover member in assembly together and with the extension engaged with radially facing rim flange of the rim to hold the ring member and the cover member in assembly together on the wheel.

9. The wheel structure of claim 8 further characterized by the ring member comprising a tire side wall simulating ring member bridged over the tire rim as well as a side wall portion of the tire, the slot areas being disposed in an inner margin of said ring member opposite the tire rim.

10. In a wheel structure including a wheel comprised of a body part and a tire rim carrying a tire and with the tire rim having a radially facing rim surface as well as a rim shoulder, a cover structure for self-retained assembly on a wheel, the cover structure including an axially outer metallic cover member for concealing at least a portion of the wheel and having circumferentially spaced resiliently deflectable retaining extensions annularly arranged and adapted for cover retaining press-on, pry-off engagement with the vehicle wheel, and an axially inner cover member made from a suitable synthetic material for concealing at least another portion of the wheel, the axially inner cover member having annularly arranged circumferentially spaced slot areas with the axially outer metallic cover member having its circumferentially spaced resiliently deflectable extensions engaged in and extended through said slot areas to secure the axially inner and the axially outer cover members in assembly together, said slot areas when engaged with said extensions comprising means to prevent the axially inner cover member from moving radially relative to the axially outer cover member the extensions providing means for engaging the cover members in assembly together and in assembly with radially facing rim surface on the wheel.

11. The wheel structure of claim 10 further characterized by each of said slot areas being generally T-shaped in configuration and with said extensions having an axial leg portion and a return-bent terminal for engagement with the radial rim surface, the return-bent terminals cooperable with the slot areas in preventing accidental disassembly of the cover members.

12. The wheel structure of claim 10 further characterized by the cover structure including a central cover member and by the axially inner cover member comprising a ring having its radially inner margin engageable against the body part, the central cover member being sustained in assembly on the body part and having its radially outer margin engaged against the ring to maintain the radially inner margin of the ring bottomed against the body part.

13. The wheel structure of claim 10 further characterized by said axially inner cover member comprising a non-metallic ring and with the slot areas being disposed in an outer margin of the ring, the axially outer cover member having a radially outer shoulder area bottomed against the ring and with the extensions being cooperable with the shoulder area to secure the rim in bottomed engagement against the rim shoulder.

14. The wheel structure of claim 13 further characterized by the axially outer metallic cover member comprising a metallic ring with the retaining extensions being provided at a radially inner margin of the metallic ring.

15. The wheel structure of claim 14 further characterized by the extensions each having an axial leg and a terminal, the terminal being engaged against the radially facing rim surface under tension and with the leg urging the slot edge against which it is engaged radially inwardly to assist in maintaining the inner ring margin bottomed against the body part.

16. In a wheel structure including a wheel comprised of a body part and a tire rim carrying a tire and with the tire rim having a radially facing rim surface as well as a rim shoulder, a cover structure for self-retained assembly on a wheel, the cover structure including an axially outer metallic cover member for concealing at least a portion of the wheel and having annularly arranged circumferentially spaced resiliently deflectable retaining extensions adapted for cover retaining press-on, pry-off engagement with the vehicle wheel, and an axially inner cover member made from a suitable synthetic material for concealing at least another portion of the wheel, the axially inner cover member having annularly arranged circumferentially spaced slot areas with the axially outer metallic cover member having its circumferentially spaced resiliently deflectable extensions engaged in and extended through said slot areas to secure the axially inner and the axially outer cover members in assembly together, the extensions providing means for engaging the cover members in assembly together and in assembly with radially facing rim surface on the wheel, the metallic ring having an outer ring margin, the tire side wall ring member having a bulged portion which is engaged at its radially inner side by the rib area and at its radially outer side by the outer ring margin whereby the tire side wall ring member is bottomed against the rim shoulder and a terminal rim flange, the slot areas and the extensions and the bulged area and the outer ring margin cooperating together to prevent radial pull-out of the axially inner cover member from between the axially outer cover member and the tire rim.

17. In a cover structure for self-retained assembly on a wheel, the cover structure including a metallic cover member for concealing at least a portion of the wheel and having circumferentially spaced resiliently deflectable retaining extensions annularly arranged and adapted for cover retaining press-on, pry-off engagement with the vehicle wheel, and an axially inner cover member made from a suitable synthetic material for concealing at least another portion of the wheel, the axially inner cover member having annularly arranged circumferentially spaced slot areas with the metallic cover member having its circumferentially spaced resiliently deflectable extensions engaged in and extended through said slot areas to secure the cover members in assembly together, the extensions providing means for engaging the cover members in assembly together and in assembly with the wheel, each of said slot areas being generally T-shaped in configuration.

References Cited in the file of this patent

UNITED STATES PATENTS

| | | |
|---|---|---|
| 2,214,745 | Lyon | Sept. 17, 1940 |
| 2,531,449 | Lyon | Nov. 28, 1950 |